US009955244B2

United States Patent
Rothkopf

(10) Patent No.: US 9,955,244 B2
(45) Date of Patent: Apr. 24, 2018

(54) ELECTRONIC DEVICE WITH SPEAKER ENCLOSURE SENSOR

(71) Applicant: Apple Inc., Cupertino, CA (US)

(72) Inventor: Fletcher R. Rothkopf, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/722,708

(22) Filed: May 27, 2015

(65) Prior Publication Data

US 2016/0353186 A1 Dec. 1, 2016

(51) Int. Cl.
*H04R 1/02* (2006.01)

(52) U.S. Cl.
CPC ......... *H04R 1/028* (2013.01); *H04M 2250/12* (2013.01); *H04R 2499/11* (2013.01)

(58) Field of Classification Search
CPC . H04R 9/06; H04R 1/02; H04R 1/105; H04R 1/08; H04R 1/025; H04R 1/026
USPC .................................. 381/333, 334, 365, 388
See application file for complete search history.

(56) References Cited

U.S. PATENT DOCUMENTS

| | | | | |
|---|---|---|---|---|
| 5,420,935 | A * | 5/1995 | Shinohara | H04R 1/1016 379/431 |
| 7,605,687 | B2 * | 10/2009 | Morris | G08B 3/10 340/384.73 |
| 8,054,992 | B2 * | 11/2011 | Sapiejewski | G10K 11/178 381/71.6 |
| 8,525,689 | B2 | 9/2013 | Smith et al. | |
| 8,558,708 | B2 * | 10/2013 | Albert | G08B 3/10 181/151 |
| 8,810,426 | B1 * | 8/2014 | Morris | G08B 3/10 116/137 R |
| 9,179,220 | B2 * | 11/2015 | Morris | H04R 17/10 |
| 2008/0149417 | A1 | 6/2008 | Dinh et al. | |
| 2012/0082317 | A1 | 4/2012 | Pance et al. | |
| 2014/0112510 | A1 | 4/2014 | Yang et al. | |
| 2014/0193018 | A1 | 7/2014 | Lim et al. | |
| 2014/0321662 | A1 | 10/2014 | Kihm | |
| 2014/0334653 | A1 | 11/2014 | Luna et al. | |

OTHER PUBLICATIONS

"International Search Report and Written Opinion" from International Application No. PCT/US2016/025183, dated May 24, 2016, 12 pages.

* cited by examiner

*Primary Examiner* — Suhan Ni
(74) *Attorney, Agent, or Firm* — Kilpatrick Townsend & Stockton LLP

(57) ABSTRACT

An electronic device may have a speaker for presenting audio to a user. The speaker may have a speaker diaphragm mounted in a speaker enclosure and driven using a speaker driver. A sensor such as a gas sensor, particulate sensor, or other environmental sensor may be mounted within the speaker enclosure. Control circuitry in the electronic device may move the speaker diaphragm to draw fresh air into the speaker enclosure or to capture a sample of liquid while using the environmental sensor to make sensor measurements. The control circuitry may use a display, other visual output devices, audio output devices, and/or vibrating output components to present alerts to the user based on environmental data from the environmental sensor.

17 Claims, 7 Drawing Sheets

ELECTRONIC DEVICE WITH SPEAKER ENCLOSURE SENSOR

BACKGROUND

This relates generally to electronic devices, and, more particularly, to electronic devices with sensors.

Electronic devices such as cellular telephones, computers, watches, and other devices contain sensors. For example, pressure sensors may be used to measure barometric pressure and ambient light sensors may be used to measure the amount of light surrounding an electronic device.

It may be desirable to provide additional sensors in an electronic device to provide a user of the electronic device with more information about the user's environment. This poses challenges. For optimal performance, it may be desirable to mount sensors in device locations in which the sensors are sensitive to changes in the environment. If a sensor is embedded deep within a device, the sensor may not be able to make accurate measurements on the environment and may consume more space within a device than desired. In an exposed location on the surface of a device, a sensor may be sensitive to the environment, but may be vulnerable to impact damage.

It would therefore be desirable to be able to provide electronic devices with improved sensor arrangements.

SUMMARY

An electronic device may have a speaker for presenting audio to a user. The speaker may have a speaker diaphragm mounted in a speaker enclosure. The speaker diaphragm may be controlled using a speaker driver.

A sensor such as a gas sensor, particulate sensor, or other environmental sensor may be mounted within the speaker enclosure. The sensor in the enclosure may make temperature measurements, humidity measurements, measurements on liquids such as biological measurements, measurements on the amount of particulates in the air, measurements on ambient air gas concentrations, and other measurements.

Control circuitry in the electronic device may move the speaker diaphragm to draw fresh air into the speaker enclosure while using the environmental sensor to make sensor measurements. The diaphragm may also be used to hold a liquid sample in place adjacent to a sensor during sensor measurements.

The control circuitry may use a display or other visual output devices, audio output devices, and mechanical output components to present alerts to a user based on environmental data from an environmental sensor.

DETAILED DESCRIPTION

To evaluate the environment in which an electronic device is operated, an electronic device may be provided with sensors. The sensors may include sensors for monitoring the air, for evaluating water samples, and for making other measurements on a user's surroundings. One or more of these sensors may be located within a speaker enclosure in the electronic device. By locating sensors within the speaker enclosure, space may be conserved within the electronic device. Movement of a diaphragm in the speaker may also help circulate air or water that is being sampled, so that sensor measurements accurately reflect the current environment surrounding the device.

Figure 1:
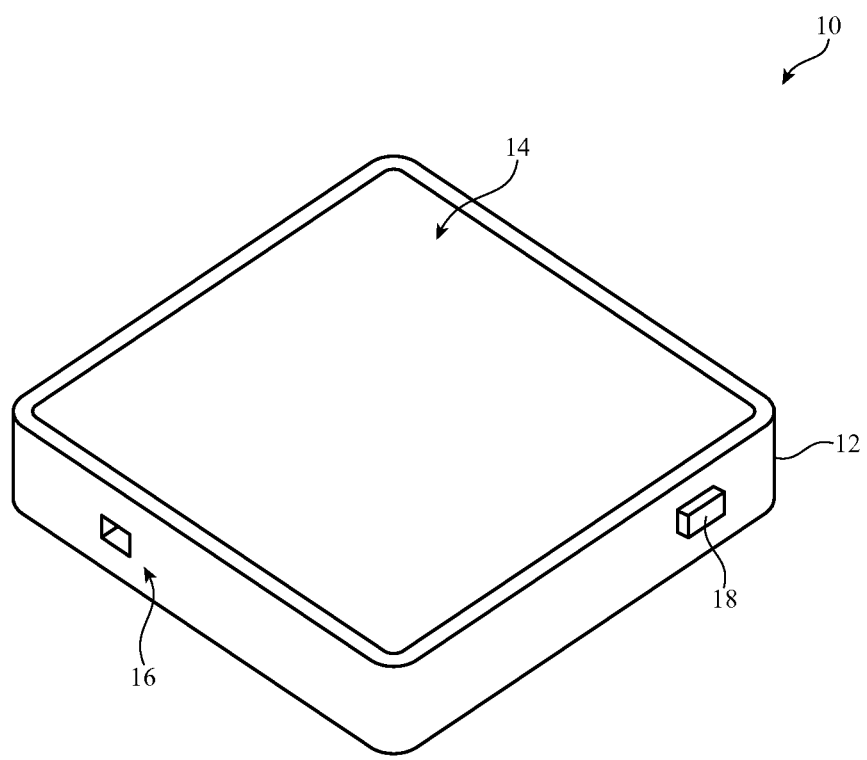
FIG. 1 is a perspective view of an illustrative electronic device having components such as a speaker and sensors in accordance with an embodiment.

An illustrative electronic device of the type that may be provided with a speaker enclosure that contains sensor circuitry is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device (e.g., a watch with a wrist strap), a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, wrist device, or other portable computing device. Other configurations may be used for device 10 if desired. The example of FIG. 1 is merely illustrative.

In the example of FIG. 1, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, titanium, gold, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies.

Display 14 may be protected using a display cover layer such as a layer of transparent glass, clear plastic, sapphire, or other transparent materials. The display cover layer may planar or curved and may have a rectangular outline, a circular outline, or outlines of other shapes. If desired, openings may be formed in the display cover layer. For example, an opening may be formed in the display cover layer to accommodate a button, a speaker port, or other component. Openings may be formed in housing 12 to form communications ports (e.g., an audio jack port, a digital data port, etc.), to form openings for buttons, or to form audio ports (e.g., openings for speakers and/or microphones). In the example of FIG. 1, housing 12 has an opening that forms speaker port 16 and an opening to accommodate button 18. Other arrangements may be used for housing 12, if desired.

Figure 2:
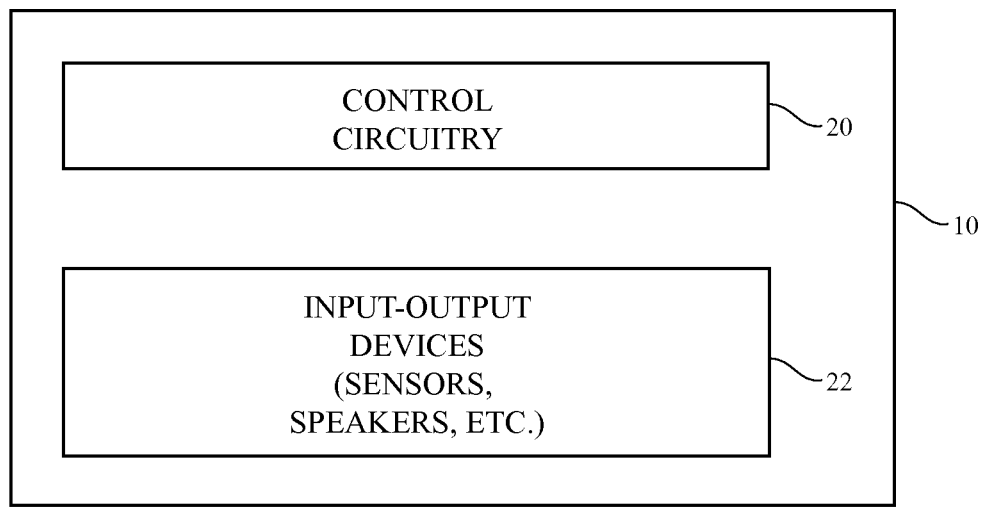
FIG. 2 is a schematic diagram of an illustrative electronic device of the type shown in FIG. 1 in accordance with an embodiment.

FIG. 2 is a schematic diagram of device 10. As shown in FIG. 2, electronic device 10 may have control circuitry 20. Control circuitry 20 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 20 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 22 may be used to allow data to be supplied to device 10 and to allow data to be provided from device 10 to external devices. Input-output devices 22 may include buttons, joysticks, scrolling wheels, touch pads, key pads, keyboards, microphones, speakers, tone generators, vibrators, cameras, sensors (e.g., ambient light sensors, proximity sensors, magnetic sensors, force sensors, touch sensors, accelerometers, and other sensors), light-emitting diodes and other status indicators, data ports, etc. A user can control the operation of device 10 by supplying commands through input-output devices 22 and may receive status information and other output from device 10 using the output resources of input-output devices 22.

Control circuitry 20 may be used to run software on device 10 such as operating system code and applications. During operation of device 10, the software running on control circuitry 20 may use sensors in devices 22 to gather sensor data. If desired, control circuitry 20 may use devices 22 to issue alerts and take other suitable action in response to the gathered sensor data and other information. For example, a visible alert may be displayed on a display, a vibrator may be used to provide a vibration alert, a speaker or other audio output device may be used to create an audible alert, a light-emitting diode or set of light-emitting diodes may produce light with a pattern of colors and/or intensities that serve as an alert, or other output may be provide that alerts and informs a user of environmental conditions. Alerts may be provided to enhance a user's safety, to provide a user with health and fitness information, to provide weather information, or to inform a user of other information related to environmental sensor data.

Figure 3:
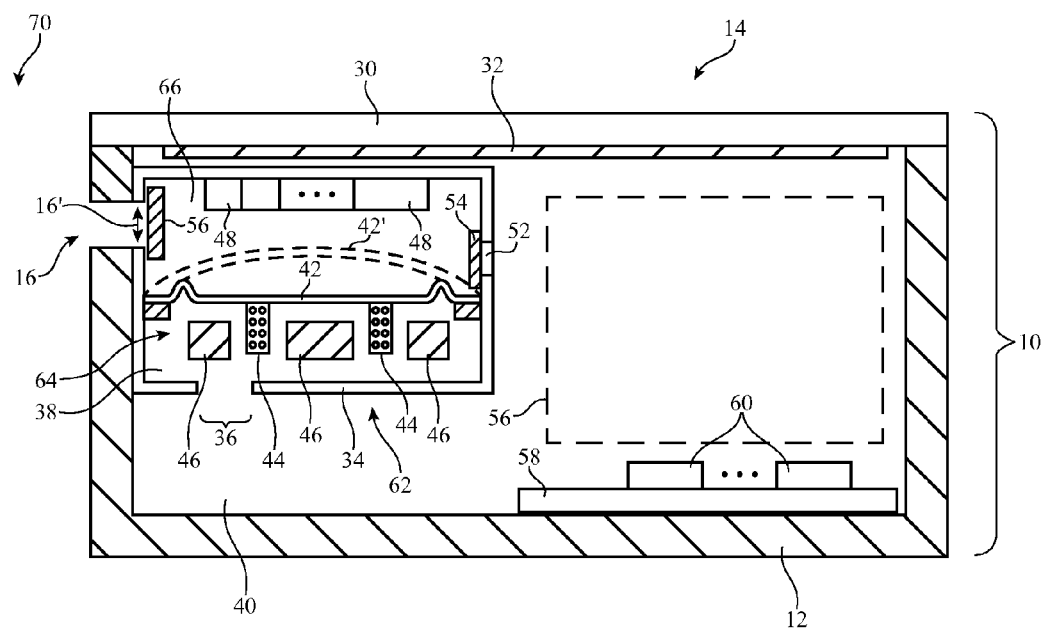
FIG. 3 is a cross-sectional side view of an electronic device with an illustrative speaker enclosure that includes sensors in accordance with an embodiment.

A cross-sectional side view of a portion of an electronic device that includes environmental sensors is shown in FIG. 3. As shown in FIG. 3, device 10 may have a housing such as housing 12. Display 14 may be mounted in housing 12. Display 14 may include display layers 32 (e.g., a liquid crystal display module, an organic light-emitting diode display, display layers of other types, etc.). The surface of display 14 may be protected using one of the layers in display layers 32 or by display cover layer 30. Display cover layer 30 may be a transparent layer of material such as a layer of plastic, glass, sapphire, or other transparent materials.

Housing 12 may have one or more openings that form audio port 16. A speaker such as speaker 62 may have a corresponding opening such as speaker enclosure opening 16' that is mounted in alignment with the opening in housing 12 that forms port 16. There may be multiple audio ports in device 10 each with a respective speaker port 16 or there may be a single speaker and associated audio port 16 in device 10. The configuration of FIG. 3 in which a single speaker is shown as being aligned with a single audio port is merely illustrative.

Speaker 62 may have a speaker driver such as speaker driver 64 mounted in a speaker enclosure such as speaker enclosure 34. Speaker enclosure 34 may have the shape of a rectangular box, a box with curved surfaces and/or planar surfaces, or any other suitable enclosure that forms a speaker cavity for speaker 62. The walls of speaker enclosure 34 may be formed from plastic (e.g., molded plastic), metal, plastic that contains fiberglass, carbon fiber, or other strands of material, or other materials.

Speaker driver 64 may include electromagnetic actuator structures such as coils and magnets for controlling the movement of speaker diaphragm 42. The movement of speaker diaphragm 42 may be controlled by signals from control circuitry 20. As shown in FIG. 3, electromagnetic actuator structures for diaphragm 42 may be formed from coils of wire such as coils 44 and magnets such as magnets 46. Coils 44 may be coupled to diaphragm 42 and may move diaphragm 42 in response to signals applied to coils 44 by control circuitry 20. This type of arrangement (which may sometimes be referred to as a moving coil arrangement) is merely illustrative. Driver 64 may use a moving magnet arrangement or other suitable configuration for controlling the position of diaphragm 42.

Diaphragm 42 may be formed from plastic, paper (e.g., coated paper), or metal, may be formed from plastic or other material that is coated with metal or other material, or may be formed from other suitable materials. Diaphragm 42 is preferably sufficiently flexible to deform when current is applied to speaker driver 64, as illustrated by deformed diaphragm 42' in the example of FIG. 3 (e.g., diaphragm 42 may deflect upwards and downwards out of the horizontal plane of illustrative diaphragm 42 of FIG. 3).

Speaker enclosure 34 may form a cavity that encloses a speaker volume such as speaker volume 66. Port 16 (i.e., the opening in device 10 formed from the opening in housing 12 and aligned enclosure opening 16') allows air and/or water in exterior region 70 to pass into speaker volume 66. Portions of speaker enclosure 34 may also form a speaker back volume cavity that encloses speaker back volume 38. Optional back volume port (opening) 36 may allow back volume 38 to communicate with additional speaker back volume regions such as extended speaker back volume 40

(e.g., to tune the acoustic response of speaker 62). Diaphragm 42 may form a flexible wall that separates speaker volume 66 from speaker back volume 38.

To avoid damage to speaker 62 due to changes in ambient pressure (e.g., changes in air pressure due to changes in altitude), a pressure vent such as vent (opening) 52 may be formed between extended speaker back volume 40 (the interior of device 10) and speaker volume 66. Vent 52 may be covered with a porous material such as porous material 54 (e.g., foam, mesh, etc.). The size of the opening for vent 52 and the density of porous material 54 may be selected to reduce the flow of air through vent 52. This allows vent 52 to serve as a pressure equalization pathway when device 10 is taken between environments at different ambient pressures, while preserving the enclosed nature of speaker enclosure 34 (i.e., while ensuring that speaker volume 66 is enclosed on all sides except at speaker port 16 to support proper acoustic operation). Porous structures 56 (e.g., a layer of plastic or metal with microperforations, a layer of open cell foam, and/or a layer of mesh) may be placed over port 16 to prevent intrusion of dirt and other contaminants into speaker volume 66.

Internal components in device 10 may be mounted in areas inside housing 12 such as internal region 56. The internal components in device 10 may be mounted on one or more substrates such as substrate 58. Substrate 58 may be, for example, a printed circuit (e.g., a rigid printed circuit board formed from a rigid printed circuit board material such as fiberglass-filled epoxy or a flexible printed circuit formed from a flexible material such as a layer of polyimide or a sheet of other flexible polymer). As shown in FIG. 3, components such as components 60 may be mounted on substrate 58. Components 60 may include sensors, integrated circuits, and other circuitry (e.g., control circuitry 20 and input-output devices 22 of FIG. 2).

One or more sensors such as sensors 48 may be mounted within speaker enclosure 34. Sensors 48 may, for example, be mounted in speaker volume 66 (i.e., the cavity that is enclosed by speaker enclosure 34 and that communicates with exterior region 70 through port 16). In this position, sensors 48 may be exposed to air, water, and other materials on the exterior of device housing 12 such as materials in exterior region 70 adjacent to port 16. During operation, air and/or water (e.g., environmental fluids such as gasses in the atmosphere and water and other liquids) may be drawn into and pushed out of interior volume 66 through port 16 by the movement of diaphragm 42. For example, when diaphragm 42 is moved downwards, environmental fluid in exterior region 70 may be drawn into speaker volume 66 adjacent to sensors 48 through port 16 and when diaphragm 42 is moved upwards, the fluid that was drawn into volume 66 may be expelled from volume 66 to exterior 70 through port 16.

In the absence of the flow of air through port 16, the air adjacent to sensors 48 may become stagnant. As a result, sensor measurements may be inaccurate. When diaphragm 42 is moved, however, the air in speaker cavity 66 may be refreshed sufficiently to allow accurate measurements to be made with sensors and sensor measurements. (e.g., when diaphragm 42 is moved upwards by actuator 64). Movement of diaphragm 42 may also be used to refresh liquids in cavity 66 and/or may be used to help gather and temporarily hold a liquid sample in contact with sensors 48.

Sensors 48 may sense changes in the environment (e.g., changes in the air surrounding device 10) more rapidly than internal sensors such as sensors 60 (which may be exposed to air through restricted-flow passages such as vent 52). Accordingly, readings from sensors 60 may, if desired, be used in conjunction with readings from sensors 48 (e.g., for calibration purposes, to reduce noise in sensors 48, etc.).

Sensors 48 may include environmental sensors such as a temperature sensor, a volatile organic compound sensor, a particulate sensor, a carbon monoxide sensor, a carbon dioxide sensor, an oxygen sensor, an ozone sensor, other gas sensors, a humidity sensor, a moisture sensor, sensors that measure chemical compounds and/or biological substances in water or other liquids or in the air (e.g., water quality sensors), other liquid sensors, or other sensors for measuring the environment. Sensors 42 may be mounted on one or more substrates (e.g., sensors 42 may be mounted in an array on a printed circuit), may be mounted within one or more packages (alone or in groups of two or more sensors), may be mounted on the upper wall of speaker volume 66 (as shown in FIG. 3), may be mounted on other interior wall surfaces, or may be mounted using other arrangements.

Figure 4:
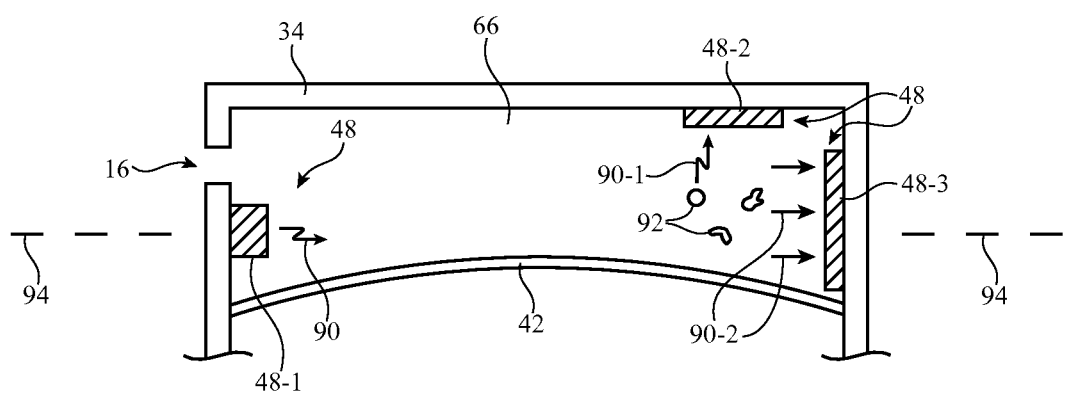
FIG. 4 is a cross-sectional side view of a portion of an illustrative speaker enclosure with a sensor that measures airborne particulates in accordance with an embodiment.

FIG. 4 is a diagram showing an illustrative sensor mounting arrangement for a particle sensor. In the illustrative configuration of FIG. 4, sensor 48 has a light source such as light source 48-1 that emits light 90. Sensor 48 also has one or more light detectors such as light detectors 48-2 and 48-3. Detectors 48-2 and 48-3 may be used to monitor the light emitted from light source 48-1. Speaker enclosure 34 has an elongated shape that extends along longitudinal axis 94. With one suitable arrangement, light source 48-1 is located at one end of enclosure 34 and light detectors 48-2 and 48-3 are located at an opposing end of enclosure 34. Light 90 may be scattered by particulates 92 in the air within speaker cavity 66. Scattered light 90-1 may be detected by light detector 48-2. The presence of particulates 92 in the path between light source 48-1 and detector 48-2 may also affect the light that is received at detector 48-2 (shown as light 90-2 in FIG. 4). By analyzing light 90-1 and/or light 90-2, the detectors of particulate sensor 48 can characterize particulates 92. For example, characteristics such as particulate size, particulate density (particulate count), and other particulate characteristics may be measured.

Figure 5:
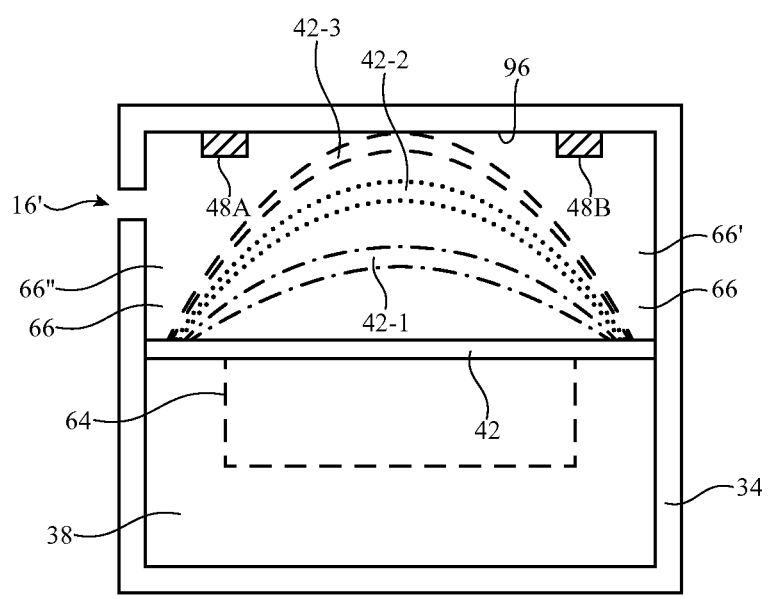
FIG. 5 is a cross-sectional side view of an illustrative speaker enclosure showing how a diaphragm in the speaker may be placed in different positions during different types of operation in accordance with an embodiment.

The position of speaker diaphragm 42 may be controlled to control the movement of air and/or liquid in speaker volume 66. Consider, as an example, the different illustrative positions for speaker diaphragm 42 of FIG. 5. In position 42-1, air and/or liquid in speaker volume 66 may move between portion 66" of speaker volume 66 and portion 66' of speaker volume 66. Speaker diaphragm 42 may normally extend no further than position 42-1 (e.g., when playing loud audio). During audio playback, diaphragm movement may be sufficient to enhance airflow through volume 66 and thereby ensure that sensors such as illustrative sensors 48A and 48B receive fresh air to analyze. In some situations, there may be no active audio playback and/or additional fresh air may be desired. In these situations, a larger drive signal may be provided to driver 64 to overdrive diaphragm 42 into overdriven location 42-2. If no audible audio playback is desired, diaphragm 42 may be driven with a subaudible frequency (e.g., a frequency of 1-5 Hz, 1-20 Hz, less than 3 Hz, less than 5 Hz, less than 15 Hz, less than 20 Hz, or other suitable frequency that is not audible to the human ear). Sub-audible frequency modulation may also be imposed on top of an existing audio signal, if desired.

Figure 6:
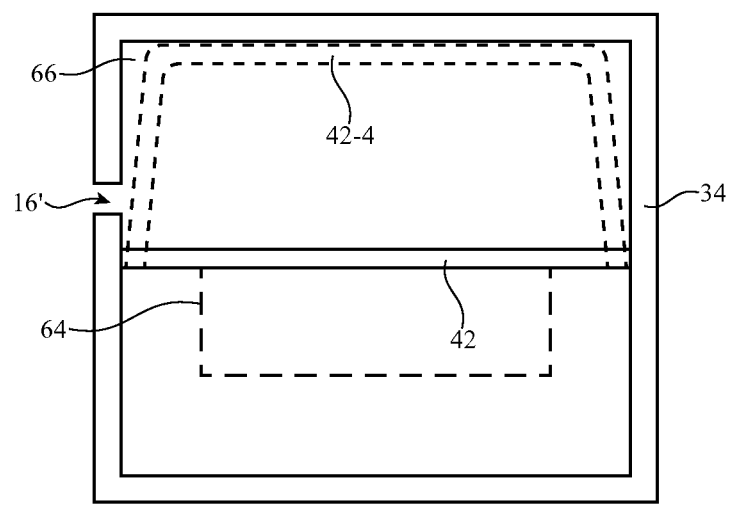
FIG. 6 is a cross-sectional side view of an illustrative speaker enclosure in a configuration in which a diaphragm has been placed in an extended state to flush material out of the speaker enclosure in accordance with an embodiment.

In order to capture and hold samples for analysis (e.g., to capture an air or water sample), diaphragm 42 may be placed in position 42-3. In this position, diaphragm 42 contacts inner surface 96 of speaker enclosure 34 and holds the captured sample in sealed region 66' of speaker volume 66 for analysis by sensor 48B in region 66'. Liquid samples may also be captured by fully retracting diaphragm 42 (i.e., moving diaphragm 42 downwards in the example of FIG. 5) while device 10 is submersed in liquid, thereby drawing a liquid sample into cavity 66. The captured sample may, if desired, be held for an extended period of time (e.g., 1-10 seconds, more than 10 seconds, etc.) to allow sensor 48B to completely analyze the sample. Following analysis of the sample or other operating conditions in which it is desired to flush the interior of the speaker enclosure, speaker diaphragm 42 may be extended to position 42-4 of FIG. 6 (e.g., a position in which most or all of the air or liquid in volume 66 is expelled to the exterior of device 10 through speaker enclosure opening 16' and the corresponding opening in housing 12).

Figure 7:
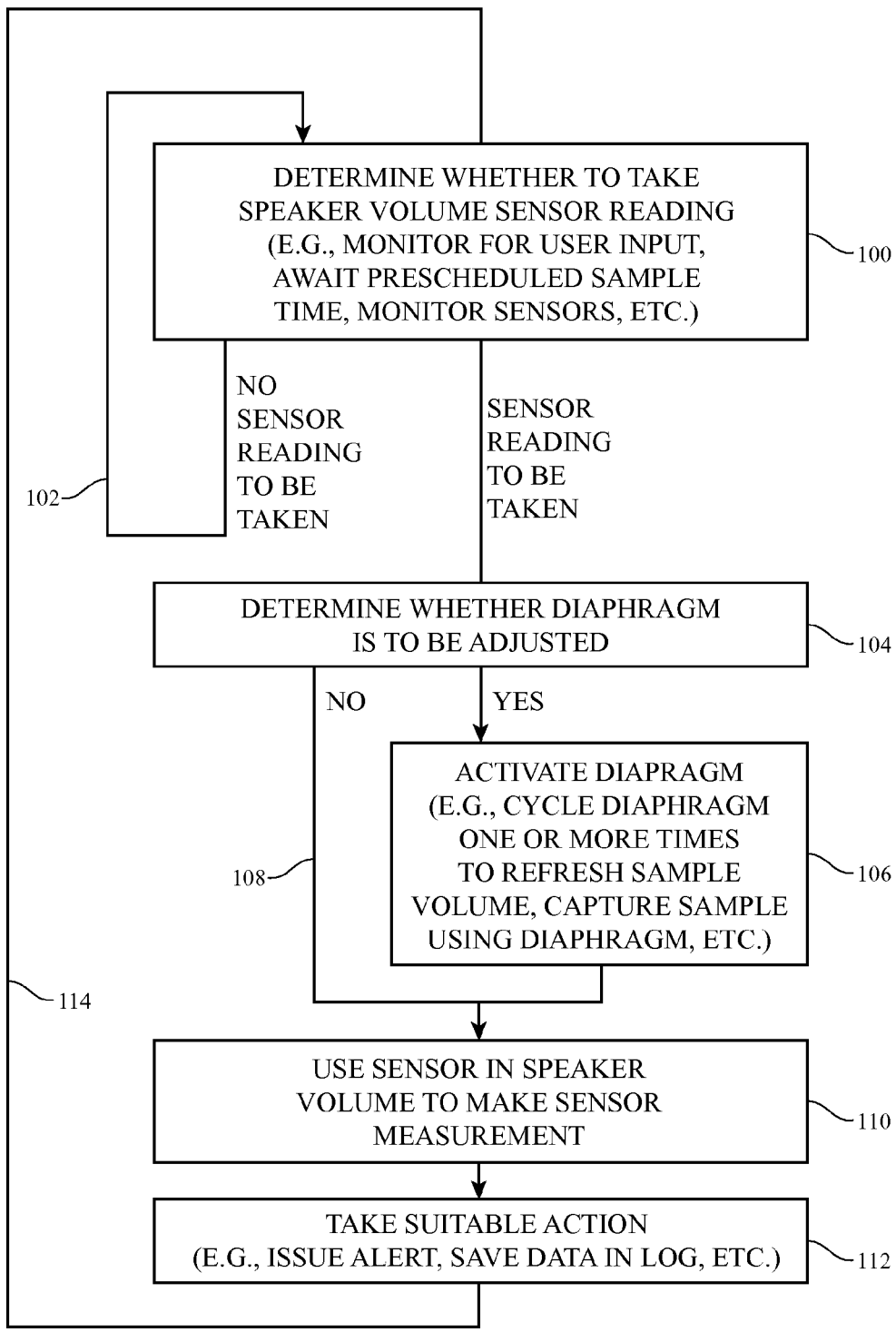
FIG. 7 is a flow chart of illustrative steps involved in using sensors in an electronic device to make measurements on the environment surrounding the electronic device in accordance with an embodiment.

Illustrative steps involved in using one or more sensors 48 while operating speaker 62 and other components in device 10 of FIGS. 1, 2, and 3 are shown in FIG. 7.

At step 100, device 10 (e.g., control circuitry 20) may determine whether to gather sensor data from one or more of sensors 48 in speaker volume 66. Data gathering operations may be triggered by any suitable trigger event. For example, control circuitry 20 may gather input from a user (e.g., touch input on a touch screen, button input, voice recognition input from a voice recognition system, etc.) that indicates that a sensor measurement should be made. Control circuitry 20 may also monitor sensors and other circuitry in device 10 to determine whether sensor measurement trigger criteria have been satisfied. For example, control circuitry 20 may make measurements with a particulate sensor or other environmental sensor based on input from a carbon monoxide sensor (e.g., when a predetermined carbon monoxide level has been exceeded) or other environmental sensor, may make environmental sensor measurements when a particular geographic location has been reached (e.g., when satellite navigation system circuitry in device 10 indicates that a predetermined location has been reached), may make environmental sensor measurements when a predetermined time and date has been reached (i.e., according to a schedule), may make a measurement when an accelerometer registers a particular motion of device 10, or based on satisfaction of other suitable sensor triggering criteria.

If no measurements with environmental sensors are to be made, processing may loop back to step 100 for further trigger condition monitoring, as indicated by line 102.

If it is determined during the operations of step 100 that an environmental sensor measurement is to be made, processing may continue at step 104. At step 104, control circuitry 20 may determine whether speaker diaphragm 42 is to be adjusted. During normal audio playback or other conditions, speaker diagram 42 may be moving sufficiently to ensure that the material in speaker cavity 66 is not stagnant. In this situation, additional activation of diaphragm 42 may not be desired and processing can proceed to step 110. If, however, there is no audio playing through speaker 62 and speaker diaphragm 42 is static or is otherwise not moving sufficiently to ensure that the material within cavity 66 is not stagnant (e.g., if audio playback volume is low), or if it is desired to move diaphragm 42 to capture a liquid sample, appropriate drive signals may be applied to speaker 62 at step 106.

During the operations of step 106, diaphragm 42 may be cycled one or more times to refresh the air or other contents of cavity 66. The frequency and amplitude with which diaphragm 42 is cycled may be determined based on sensor readings from environmental sensors or other sensors, may be determined based on user input (e.g., user-adjusted settings), may be based on time and date information, or may be based on other suitable parameters. In some situations, sensor(s) 48 is being used to measure and air sample, so moving diaphragm 42 sufficiently will help ensure that the air within cavity 66 is fresh and accurately reflects a user's current surroundings (i.e., the sampled air will be representative of the air the user is breathing). In other situations, device 10 may be submersed within a liquid such as water to capture a liquid sample. As an example, a user may direct device 10 to capture a water sample. Device 10 may then issue a visible message that directs the user to immerse device 10 and port 16 in water. In this type of situation, diaphragm 42 may be moved into a sample capture position such as position 42-3 of FIG. 5 (or a fully retracted diaphragm position) to help gather a sample and hold a captured sample in place sufficiently long for analysis by an environmental sensor. Visible output or other output may be provided to the user to indicate when sample capture operations have been completed (e.g., so that the user may retract the device from the water in which the device has been immersed).

Once diaphragm 42 has been moved and/or is moving with desired movements to optimize sensor measurements and/or capture a sample, sensor(s) 48 may, at step 110, be used to gather environmental sensor data. For example, control circuitry 20 may use sensor(s) 48 to gather a temperature reading, a volatile organic compound reading, particulate density data, carbon monoxide data, oxygen data, ozone data, carbon dioxide data, moisture data, humidity data, or other sensor data. The data may be stored in storage in control circuitry 20 and may be analyzed using the processing circuitry of control circuitry 20.

At step 112, control circuitry 20 may take suitable actions based on the analyzed data from environmental sensor(s) 48 and/or other sensors, based on time and date information, based on geographic data, based on user input, and/or based on other data. Sensor data may be retained in a log for later analysis, alerts may be issued, and device operations may be altered based on the results of the environmental sensor data analysis performed by control circuitry 20. The alerts that may be produced may include visual alerts on a display (e.g., text alert messages and/or graphical alert messages), visible alerts on a set of one or more light-emitting diodes or other status indicator lights, visible alerts that involve patterns of light flashes, visible alerts that involve changing the color of output light, or other visible alerts. The alerts that are produced may also include audible alerts. For example, device 10 may issue an alert tone or pattern of tones, may play a warning message, or may use other sound output to inform a user of an environmental condition or other condition that has been detected using the environmental sensors and/or other data. Vibration-base alerts and other tactile alerts (thumps, etc.) may be used to alert a user without creating a visible and/or audible disturbance and/or may be used in conjunction with visible and/or audible alert message outputs.

If desired, other actions may be triggered by the detection of particular conditions with environmental sensors 48 and data from other sources. As an example, wireless or wired communications circuitry in input-output devices 22 may be used to send a text message, email, or other electronic alert message to a local or remote alert message recipient. Messages may be used to send data to a remote server (e.g., for health tracking and other data logging applications, for further monitoring and analysis, etc.). If instructed by a user, device 10 user may automatically post environmental sensor readings and other data to a private or public website or other cloud service.

Consider, as an example, a scenario in which a user of device 10 enters an environment with a high particle count. In this situation, device 10 may issue an alert that a safe particulate level has been exceeded or is in danger of being exceeded. The user can be instructed to wear a mask or other protective gear.

As another example, a user may enter a freshly painted room. The paint in the room may be emitting volatile organic compounds. Device 10 can use a volatile organic compound sensor to detect the compounds, inform the user of the detected concentration of compounds, and warn the user to leave the area if a predetermined concentration of the compounds has been exceeded.

A user might exercise on a hot day. As the user is exercising, device 10 may use a temperature sensor to monitor the current temperature. If the temperature is too high, the user can be alerted. An accelerometer or other sensor that detects user movement and/or other sensors may be used to refine the alert. For example, if the user is relatively inactive, the alert can be issued only when a relatively high temperature has been exceeded, whereas if the user is active, and/or the humidity level is elevated, the alert can be issued at a lower temperature. Measured ozone levels can also be used to determine when to issue alerts. If the ozone level is high, a user may be instructed to forgo excessive exercise.

A user may use device 10 to monitor for particulates that are generated by smoke. For example, a user may be sleeping while device 10 monitors for the presence of particulates that are indicative of smoke. If smoke is detected, vibrating alerts, audible alerts, visible alerts, wirelessly transmitted alerts, or other alerts may be used to awaken the user, instruct the user to locate fresh air, and summon help. Gas sensor readings such as carbon monoxide readings, carbon dioxide readings, oxygen readings, and other gas measurements may also be used in determining whether alerts should be issued.

If desired, other types of alerts may be issued and other types of action may be taken based on environmental sensor data from one or more speaker cavity sensors and other data available to device 10. The forgoing examples are merely illustrative.

If desired, the processes of FIG. 7 may be performed continually, as indicated by line 114. Device 10 may make environmental sensor measurements using some or all of the sensors 48 in cavity 66, may make measurements only using sensors that have been turned on by a user, may make measurements based on wirelessly received instructions from a remote device, or may make measurements based on other suitable criteria.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   a housing having a speaker port;
   a speaker enclosure that is mounted within the housing in alignment with the speaker port and that encloses a volume of air;
   a diaphragm coupled to opposing walls of the speaker enclosure, the diaphragm separating the volume of air into a first volume in fluid communication with the speaker port and a second volume;
   a sensor for measuring material drawn through the speaker port by movement of the diaphragm, the sensor being positioned within the first volume; and
   an input-output device configured to display an alert based on sensor data from the sensor.

2. The electronic device defined in claim 1 wherein the diaphragm prevents air within the first volume from passing directly into the second volume.

3. The electronic device defined in claim 1 wherein the material received through the speaker port is air and wherein the sensor comprises an environmental sensor.

4. The electronic device defined in claim 1 wherein the sensor comprises a gas sensor.

5. The electronic device defined in claim 1, further comprising a speaker driver operatively coupled to drive the diaphragm at a sub-audible frequency between 1 and 20 Hz to draw the material into the speaker enclosure.

6. The electronic device defined in claim 1 wherein the sensor is an ozone sensor.

7. The electronic device defined in claim 1 wherein the sensor is selected from the group consisting of: an oxygen sensor, a carbon monoxide detector, and a carbon dioxide detector.

8. The electronic device defined in claim 1 wherein the sensor is a particulate sensor.

9. The electronic device defined in claim 1 wherein the sensor is a sensor selected from the group consisting of: a temperature sensor, a humidity sensor, and a biological sensor.

10. The electronic device defined in claim 1 wherein the material is air, and wherein the speaker includes a speaker driver that moves the diaphragm at a sub-audible frequency to draw the air into the first volume through the speaker port in the housing without drawing the air into the second volume.

11. The electronic device defined in claim 1, further comprising a control circuitry, wherein the control circuitry moves the diaphragm at a sub-audible frequency while gathering the sensor data with the sensor.

12. The electronic device defined in claim 1 wherein the material is air and wherein the speaker has a diaphragm that draws the air into the speaker volume while sensor data is being gathered with the sensor while the diaphragm is drawing the air into the first volume.

13. An electronic device, comprising:
    a housing defining a speaker port opening;
    a speaker having a diaphragm that is mounted in a speaker enclosure, wherein the speaker enclosure is mounted to an interior-facing surface of the housing such that an opening defined by the speaker enclosure is aligned with the speaker port opening; and
    a sensor within the speaker enclosure that makes sensor measurements on material that is drawn through the speaker port opening and the opening in the speaker enclosure due to movement of the diaphragm,
    wherein the sensor is selected from the group consisting of an oxygen sensor, a carbon monoxide detector, a carbon dioxide detector, a particulate sensor, a temperature sensor, a humidity sensor, an ozone sensor, a volatile organic compound sensor and a biological sensor.

14. The electronic device defined in claim 13 wherein the material comprises air and wherein the electronic device further comprises control circuitry that moves the diaphragm at a sub-audible frequency to draw the air into the speaker enclosure while the control circuitry makes the sensor measurements with the sensor.

15. The electronic device defined in claim 13 wherein the material comprises liquid and wherein the electronic device further comprises control circuitry that places the diaphragm in a position to hold a sample of the liquid within the speaker enclosure while the control circuitry makes the sensor measurements on the liquid with the sensor.

16. An electronic device, comprising:
- a housing defining a speaker port;
- a speaker enclosure coupled to an interior-facing surface of the housing, an opening defined by the speaker enclosure being aligned with the speaker port in the housing;
- a speaker diaphragm in the speaker enclosure; and
- a sensor in the speaker enclosure that measures air drawn into the speaker enclosure through the speaker port from outside the housing due to movement of the speaker diaphragm, wherein the sensor is not a pressure sensor.

17. The electronic device defined in claim 16 further comprising control circuitry that moves the speaker diaphragm while taking readings from the sensor.

\* \* \* \* \*